United States Patent

Yagi et al.

[11] Patent Number: 5,983,948
[45] Date of Patent: Nov. 16, 1999

[54] METHOD OF REPAIRING AN EXISTING PIPELINE INCLUDING A MAIN PIPE AND A BRANCH PIPE

[75] Inventors: Shuichi Yagi; Masaaki Itagaki; Kenji Morita, all of Kanagawa-ken, Japan

[73] Assignee: Tokyo Gas Co., Ltd., Tokyo, Japan

[21] Appl. No.: 09/203,404

[22] Filed: Dec. 2, 1998

[30] Foreign Application Priority Data

Dec. 10, 1997 [JP] Japan .................................... 9-340150

[51] Int. Cl.⁶ ...................................................... B05D 7/22
[52] U.S. Cl. .............................. 138/98; 138/97; 427/230; 264/269
[58] Field of Search ........................ 138/98, 97; 264/269, 264/35, 36, 405; 156/94; 427/230, 238

[56] References Cited

U.S. PATENT DOCUMENTS

| | | | |
|---|---|---|---|
| 3,041,204 | 6/1962 | Green ..................................... | 138/97 X |
| 4,397,890 | 8/1983 | Kinumoto et al. ..................... | 138/97 X |
| 4,440,194 | 4/1984 | Kinumoto et al. ..................... | 138/97 X |
| 5,230,842 | 7/1993 | Munde .................................. | 138/97 X |
| 5,246,641 | 9/1993 | Perkins et al. ........................ | 138/97 X |
| 5,447,664 | 9/1995 | Ito et al. ............................... | 138/97 X |
| 5,590,689 | 1/1997 | Toyoda et al. ........................ | 138/98 X |
| 5,609,186 | 3/1997 | Satake et al. ......................... | 138/98 X |
| 5,632,952 | 5/1997 | Mandich .............................. | 138/97 X |
| 5,740,838 | 4/1998 | Satake et al. ......................... | 138/98 X |
| 5,873,390 | 2/1999 | Satake et al. ......................... | 138/98 X |

*Primary Examiner*—Patrick Brinson
*Attorney, Agent, or Firm*—Nikaido Marmelstein Murray & Oram LLP

[57] ABSTRACT

A method of repairing an existing pipeline including a main pipe and a branch pipe, includes the steps of introducing a first lining pig, a first batch of a resin, and some other pigs into the branch pipe and supplying a first batch of a liquid into the branch pipe until the first lining pig reaches a branching position; introducing a second lining pig, a second batch of a resin, and some other pigs into the main pipe and supplying a second batch of a liquid into the main pipe until the second lining pig reaches an inner end thereof; drawing back the second batch of the liquid out of the main pipe so as to cause the second batch of the resin to move back toward an open end of the main pipe, thereby forming a resin lining layer on the internal surface of the main pipe; drawing back the first batch of the liquid out of the branch pipe so as to cause the first batch of the resin to move back toward an open end of the branch pipe, thereby forming a resin lining layer on the internal surface of the branch pipe.

5 Claims, 6 Drawing Sheets

METHOD OF REPAIRING AN EXISTING PIPELINE INCLUDING A MAIN PIPE AND A BRANCH PIPE

BACKGROUND OF THE INVENTION

The present invention relates to a method of repairing an existing pipeline, particularly to a method of repairing an existing underground pipeline including a main pipe and a branch pipe.

There have been known various sorts of methods for repairing an existing underground pipeline not involving excavation. One of them is to repair an existing pipe by coating the internal surface thereof with a resin, as disclosed by the applicant in Japanese Patent Application Laid No. 4-114773.

In the method according to Japanese Patent Application Laid-open No. 4-114773, an existing old pipe to be repaired is a gas service pipe buried underground, which is extending from a gas main on road side to a user's house. At first, a gas meter attached at an outer end of a gas service pipe is removed therefrom so that said outer end is exposed to become an open end. Then, a predetermined amount of liquid resin is introduced into the service pipe. Subsequently, a predetermined amount of a pressurized liquid is introduced into the service pipe, so that the liquid resin is forced to flow forward along the pipe in a plug-flow until it arrives at an inner end of the pipe. Afterwards, a suction equipment such as a suction pump is connected to the open end of the service pipe, said suction pump is then driven to produce a suction force to draw the liquid back out of the service pipe. In this way, the liquid resin is caused to flow back from the inner end of the pipe and moves through the entire length thereof, thereby coating the pipe internal surface with the liquid resin and forming a desired resin lining layer thereon.

However, the above-discussed method has been proved to have at least the following problems.

Namely, an amount of a pressurized liquid necessary to force the liquid resin to move forward in the service pipe is usually calculated by taking into account a pipe length, a pipe diameter and a volume of the liquid resin. In practice, the pipe length is defined to be a distance extending from the above open end to the above inner end (a position involving a service tee adjacent to a gas main), and such distance is measured in advance with the use of an acoustic wave pipe length measuring device.

However, the above-discussed method is found to be difficult for treating a gas service pipe involving a branch pipe (which is a further pipe branching from the service pipe). Namely, when the above method is used to repair an existing service pipe involving a branch pipe, an acoustic wave emitted into the service pipe for measuring its length (extending from the above open end to the above inner end) will be undesirably dispersed into the branch pipe. As a result, some undesired reflected waves will also be picked up, making it difficult to perform a correct measurement of the length of the service pipe which is to be repaired in a resin lining treatment. Moreover, when a liquid resin and a pressurized liquid are moving in the service pipe, they will undesirably flow into the branch pipe. Thus, it is in fact impossible to perform a desired resin lining treatment on an existing gas service pipe if it includes a branch pipe.

SUMMARY OF THE INVENTION

It is an object of the present invention to provide a pipeline lining method capable of properly treating and repairing an existing pipeline including a main pipe and a branch pipe, so as to solve the above-mentioned problems peculiar to the above-mentioned prior art.

According to the present invention, there is provided a method of repairing an existing pipeline including a main pipe and a branch pipe, said method comprising the steps of: introducing a first lining pig, a first batch of a resin, a first resin transporting pig, a first liquid absorbing material and a first liquid blocking pig into the branch pipe and supplying a first batch of a liquid into the branch pipe until the first lining pig reaches a branching position adjacent to the main pipe; introducing a second lining pig, a second batch of a resin, a second resin transporting pig, a second liquid absorbing material and a second liquid blocking pig into the main pipe and supplying a second batch of a liquid into the main pipe until the second lining pig reaches an inner end thereof; drawing back the second batch of the liquid out of the main pipe so as to cause the second batch of the resin to move back toward an open end of the main pipe, thereby forming a resin lining layer on the internal surface of the main pipe; drawing back the first batch of the liquid out of the branch pipe so as to cause the first batch of the resin to move back toward an open end of the branch pipe, thereby forming a resin lining layer on the internal surface of the branch pipe.

In one aspect of the present invention, prior to introducing the first lining pig and the first batch of a resin into the branch pipe, an acoustic wave is emitted into the branch pipe from a pipe length measuring device attached at the open end thereof, the acoustic wave is then reflected from the inner wall of the main pipe and received by the pipe length measuring device, thereby obtaining a measured value representing the length of the branch pipe.

In another aspect of the present invention, under a condition in which the branching position is blocked by the first lining pig and at a time prior to introducing the second lining pig and the second batch of a resin into the main pipe, an acoustic wave is emitted into the main pipe from a pipe length measuring device attached at the open end thereof, the acoustic wave is then reflected from the inner end of the main pipe and received by the pipe length measuring device, thereby obtaining a measured value representing the length of the main pipe.

In a further aspect of the present invention, the first batch of the liquid has a predetermined amount which is calculated by subtracting, from the total internal volume of the branch pipe, the volumes of the first lining pig, the first batch of a resin, the first resin transporting pig, the first liquid absorbing material and the first liquid blocking pig.

In a still further aspect of the present invention, the first batch of the liquid is controlled in a manner such that once the predetermined amount has been introduced into the branch pipe, the liquid supply is stopped so that the first lining pig will stop at the branching position adjacent to the main pipe, thereby blocking the branching position so as to isolate the branch pipe from the main pipe.

In one more aspect of the present invention, the second batch of resin has an amount calculated in accordance with the length and diameter of the main pipe and is made sufficient to cover a length extending from the inner end of the main pipe to the branching position so as to block said branching position, thereby preventing the second batch of liquid from invading into the branch pipe once the second batch of resin has reached the inner end of the main pipe.

In fact, the method of the present invention may also be used to repair an existing pipeline including a main pipe and a plurality of branch pipes, by adding further steps similar to the above corresponding steps needed for the branch pipe.

The above objects and features of the present invention will become better understood from the following description with reference to the accompanying drawings.

DETAILED DESCRIPTION OF THE PREFERRED EMBODIMENTS

Figure 1:
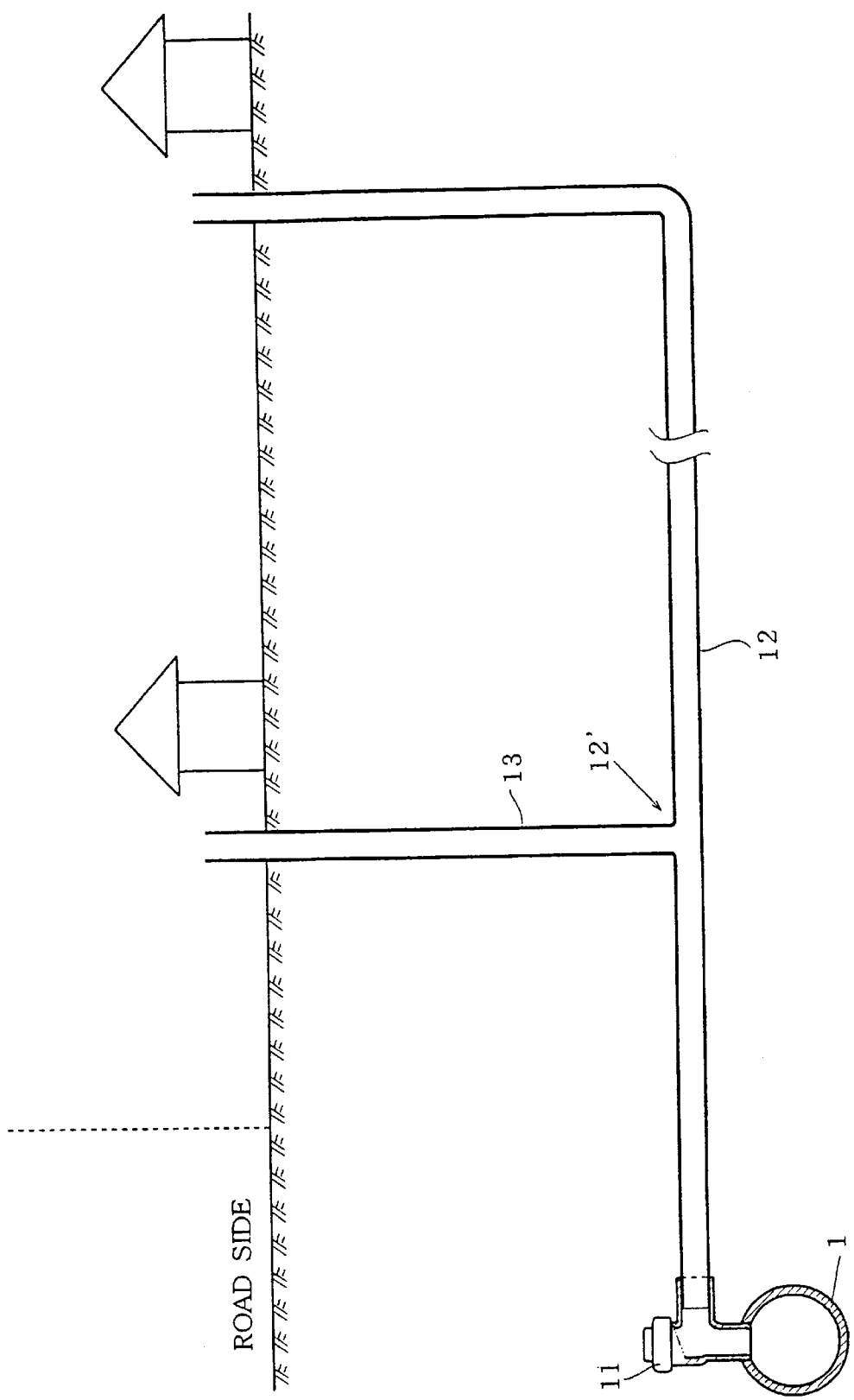
FIG. 1 is an explanatory view illustrating an existing pipeline including a main pipe and a branch pipe.

FIG. 1 shows an existing pipe line (a gas service pipe involving a branch pipe) to be treated and repaired in a method of the present invention. As shown in FIG. 1, a gas main 1 is buried underground on a road side, a gas service pipe (hereinafter referred to as main pipe) 12 is extending from the gas main 1 through a service tee 11. Such a main pipe 12 involves a branch pipe 13. In fact, both the main pipe 12 and the branch pipe 13 are extending to user's houses.

The method of the present invention will be described in detail below.

Figure 2:
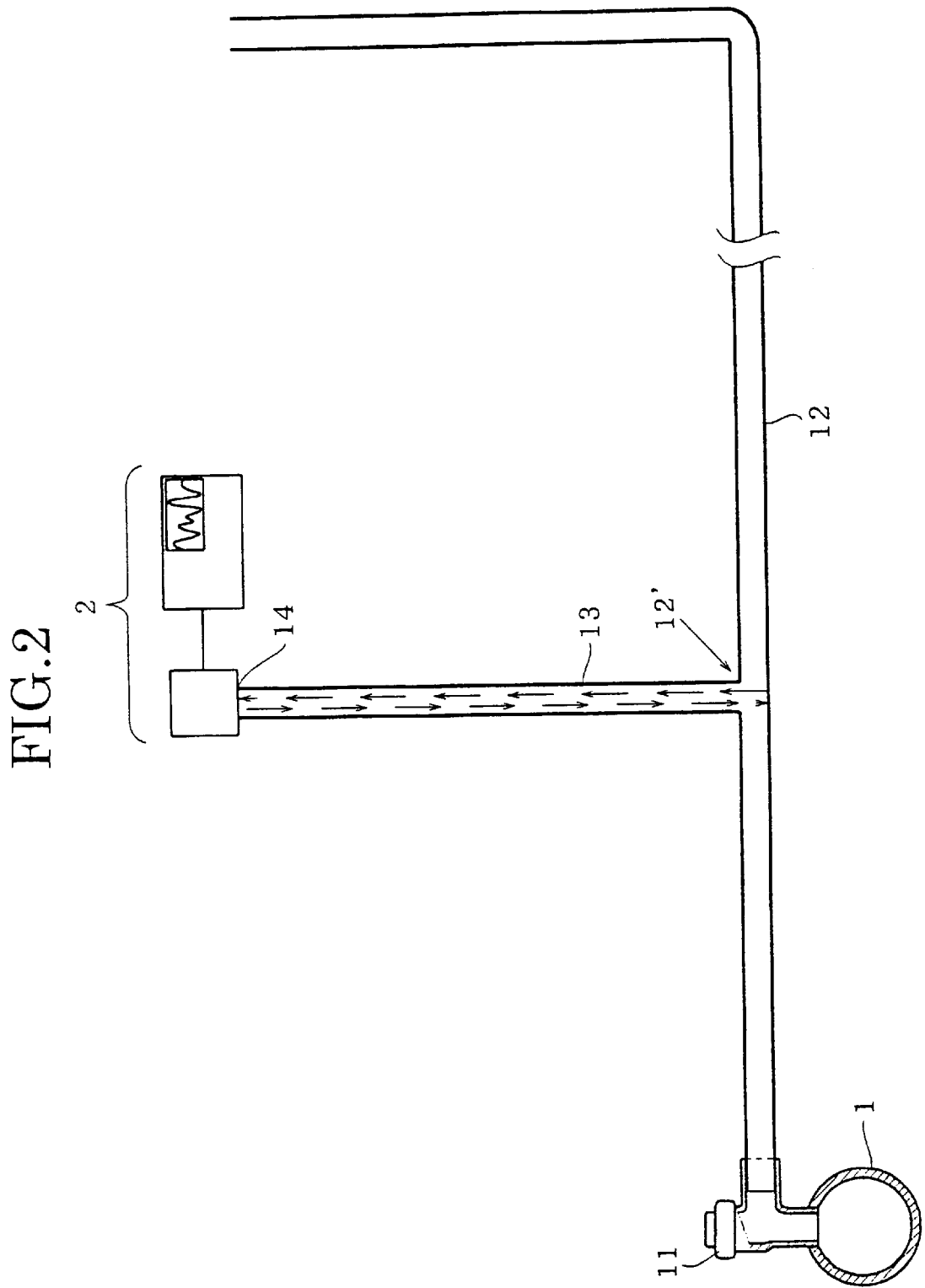
FIG. 2 is an explanatory view illustrating that the length of the branch pipe is being measured with the use of an acoustic wave pipe length measuring device.

At step 1, as shown in FIG. 2, an outer end 14 of the branch pipe 13 is exposed so as to become an open end, an acoustic wave pipe length measuring device 2 is attached to said open end 14. Then, the measuring device 2 is operated to emit an acoustic wave having a low frequency into the branch pipe 13. The acoustic wave is then reflected from the inner wall of the main pipe 12 in the vicinity of a branching position 12' and is received by the measuring device 2, thereby obtaining a measured value representing the length of the branch pipe 13.

Figure 3:
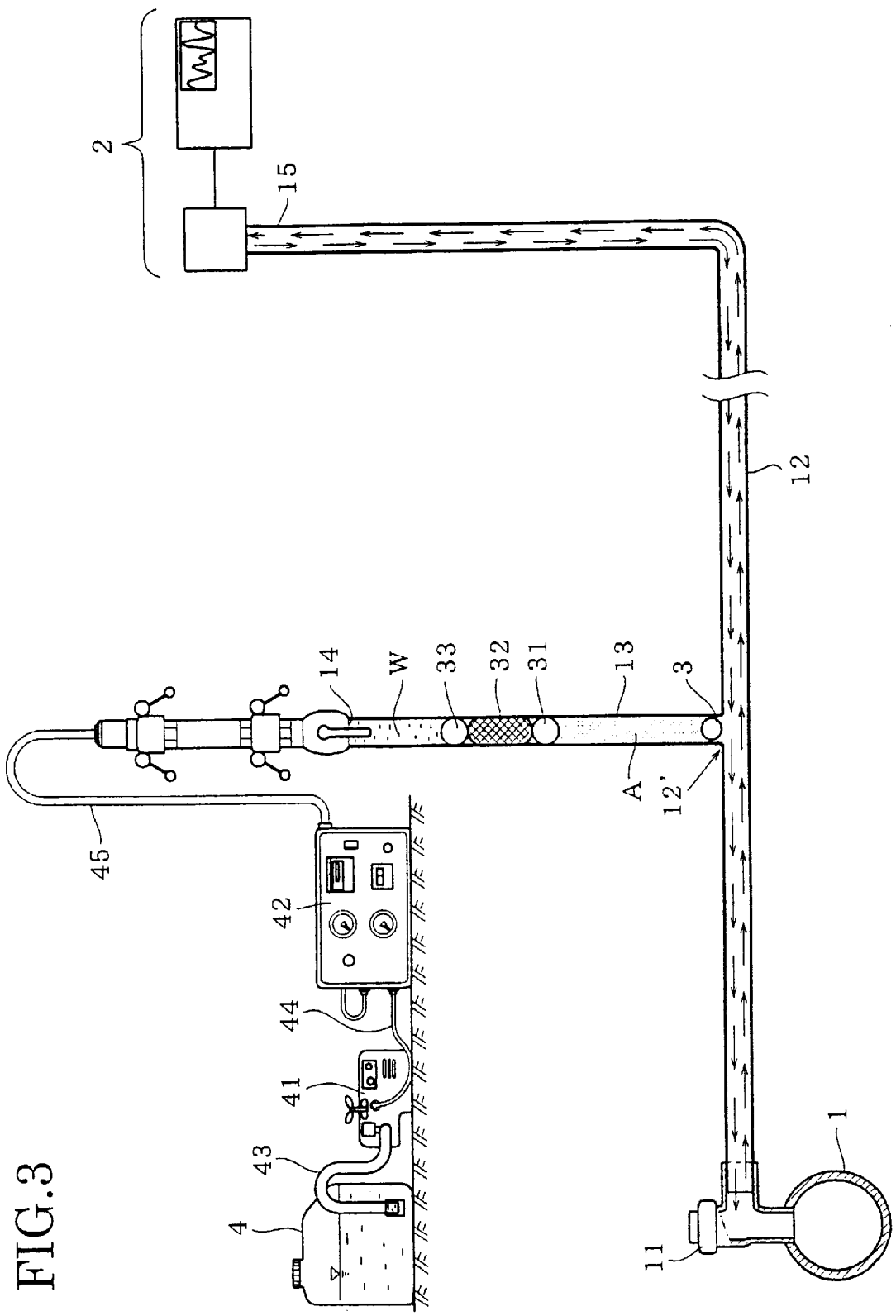
FIG. 3 is an explanatory view illustrating that a resin and a liquid have been introduced into the branch pipe and that the length of the main pipe is being measured with the use of the same acoustic wave pipe length measuring device.

At step 2, as shown in FIG. 3, a lining pig 3, a batch of liquid resin A, a resin transporting pig 31, a liquid absorbing material 32, a liquid blocking pig 33, are introduced into the branch pipe 13 through the open end 14. Here, the batch of resin A has an amount calculated in view of the length and diameter of the branch pipe 13. The resin, the pigs and the absorbing material are introduced into the branch 13, with the use of a pressurized liquid W having a predetermined amount which is calculated by subtracting a total volume (including the lining pig 3, resin A, the resin transporting pig 31, the liquid absorbing material 32 and the liquid blocking pig 33) from the total internal volume of the branch pipe 13.

Referring to FIG. 3, a system for supplying the liquid W into the branch pipe 13 includes a liquid tank 4, a liquid pump 41 and a liquid flow controlling device 42, all of which are connected in series by way of hoses 43, 44 and 45.

In particular, the liquid flow controlling device 42 is adapted to control the amount of a supplied liquid W, in a manner such that once the above predetermined amount of liquid W has been introduced into the branch pipe 13, the pump 41 will be stopped so that the lining pig 3 may stop just at a branching position 12' adjacent to the main pipe 12. In this way, the branch pipe 13 may be completely isolated from the main pipe 12.

Referring again to FIG. 3, with the branch pipe 13 being isolated from the main pipe 12 by virtue of the lining pig 3, the outer end of the main pipe 12 is exposed so as to become an open end 15, the acoustic wave pipe length measuring device 2 is attached to said open end 15. Then, the measuring device 2 is operated to emit an acoustic wave having a low frequency into the main pipe 12. The acoustic wave is then reflected from the service tee 11 and is received by the measuring device 2, thereby obtaining a measured value representing the length of the main pipe 12.

At this moment, since the branching position 12' is blocked by the lining pig 3, the main pipe 12 is allowed to be treated as if it is a pipe not involving the branch pipe 13, thereby preventing an acoustic wave from dispersing into the branch pipe 13 (so as to avoid picking up some undesired reflected waves) and thus ensuring a correct measurement of the length of the main pipe 12 which is to be repaired in the resin lining treatment.

Figure 4:
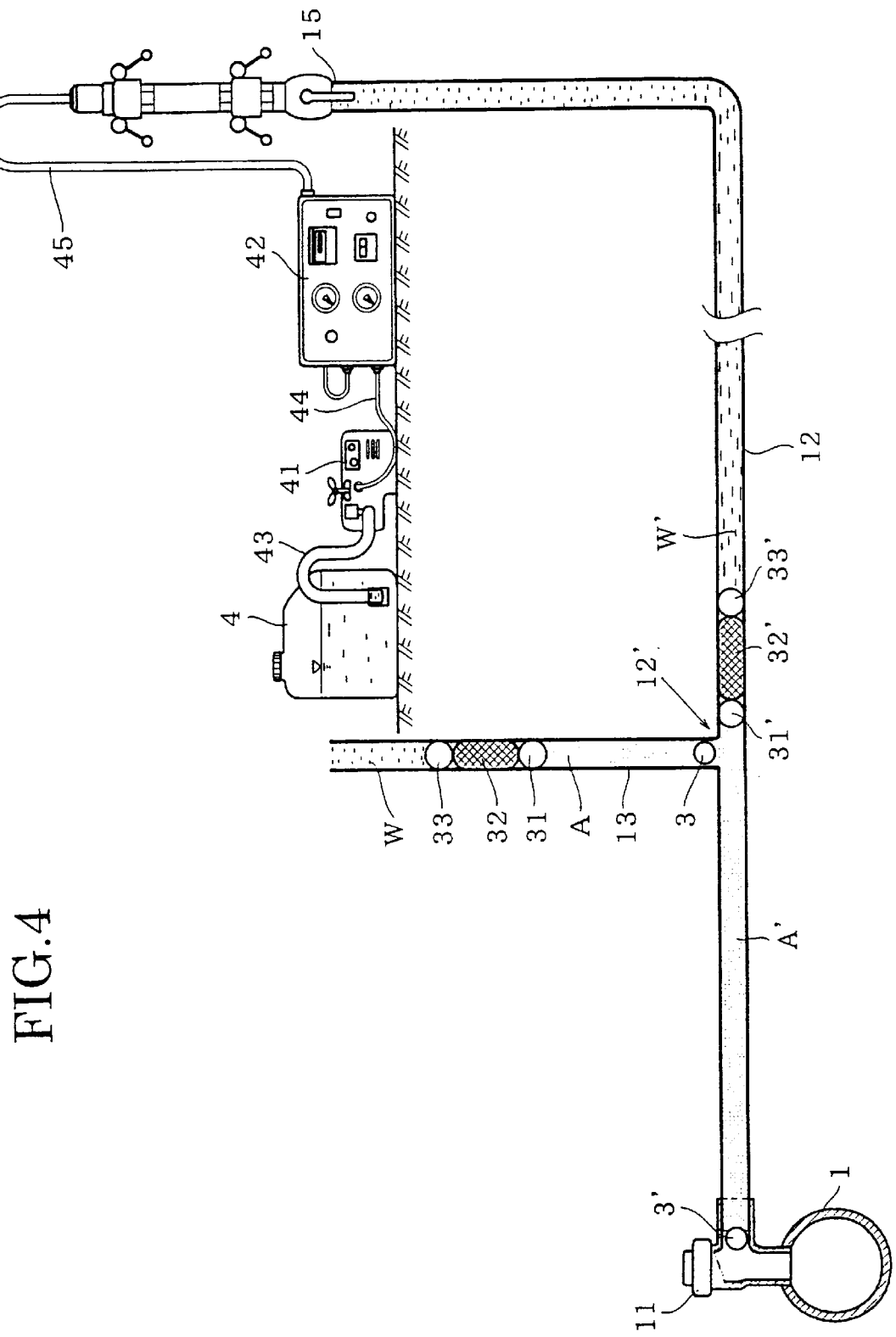
FIG. 4 is an explanatory view illustrating that a resin and a pressurized liquid have been introduced into the main pipe.

At step 3, as shown in FIG. 4, a lining pig 3', a second batch of liquid resin A', a resin transporting pig 31', a liquid absorbing material 32', a liquid blocking pig 33', are introduced into the main pipe 12 through the open end 15 with the use of a pressurized liquid W'. Here, the second batch of resin A' has an amount calculated in view of the length and diameter of the main pipe 12 and is made sufficient to cover a length extending from the service tee 11 to the branching position 12' so as to block the branching position 12'. In this way, after the resin A' has reached the service tee 11 at the inner end of the main pipe 12, it is sure to prevent the liquid W' from invading into the branch pipe 13. On the other hand, the pressurized liquid W' has a predetermined amount which is calculated by subtracting a total volume (including the lining pig 3', resin A', the resin transporting pig 31', the liquid absorbing material 32' and the liquid blocking pig 33') from the total internal volume of the main pipe 12.

Referring to FIG. 4, a system for supplying the liquid W' into the main pipe 12 is just the same as that used for injecting the liquid W into the branch pipe 13, i.e., said system includes a liquid tank 4, a liquid pump 41 and a liquid flow controlling device 42, which are connected in series by way of hoses 43, 44 and 45.

With the use of a pushing force of the pressurized liquid W', the lining pig 3', the liquid resin A', the resin transporting pig 31', the liquid absorbing material 32', the liquid blocking pig 33', are all moved forward in the main pipe 12 until the lining pig 3' arrives at the service tee 11.

Figure 5:
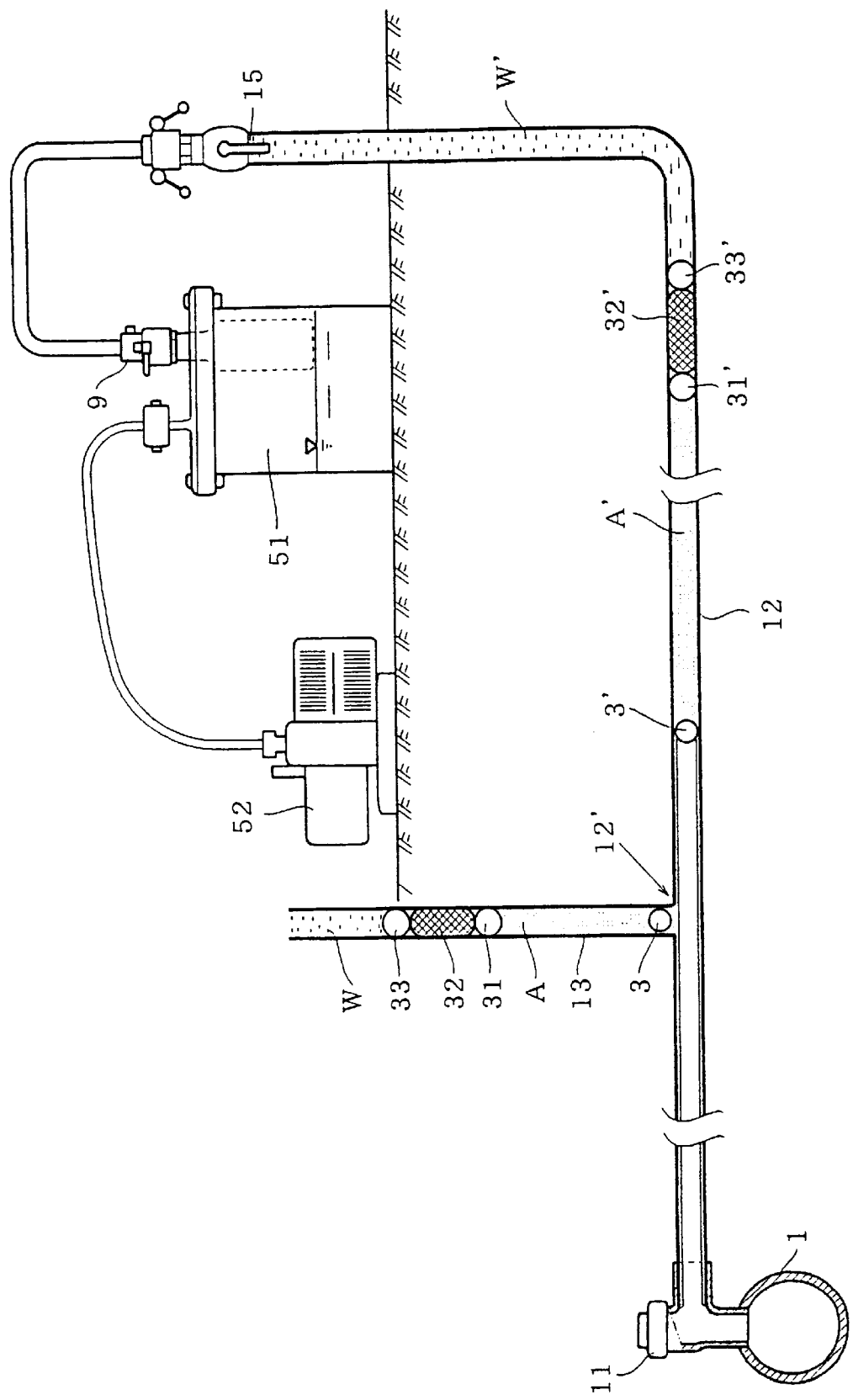
FIG. 5 is an explanatory view illustrating that the resin and the liquid are being drawn back so as to coat the internal surface of the main pipe with a resin lining layer.

At step 4, as shown in FIG. 5, a pig receiving device 9, a liquid recovering tank 51, a suction pump 52, are connected in series to the open end 15 of the main pipe 12, thereby forming a suction system for the resin lining treatment. Then, the suction system is actuated by driving the suction pump 52, so as to draw back the liquid W' from the main pipe 12. With the backward movement of the liquid W' toward the open end 15 of the main pipe 12, the resin transporting pig 33', the liquid absorbing material 32', the liquid blocking pig 31', the resin A' and the lining pig 3', are all caused to move back towards the open end 15 of the main pipe 12.

At this moment, since the branching position 12' is blocked by the lining pig 3, the main pipe 12 is allowed to be treated as if it does not involve the branch pipe 13. Therefore, it becomes possible to prevent the resin A' from flowing into the branch pipe 13, ensuring a proper resin lining treatment on the main pipe 12. In this way, a desired resin lining layer having a uniform thickness may be formed on the internal surface of the main pipe 12, thereby easily accomplishing the operation of the resin lining treatment on the main pipe 12.

Figure 6:
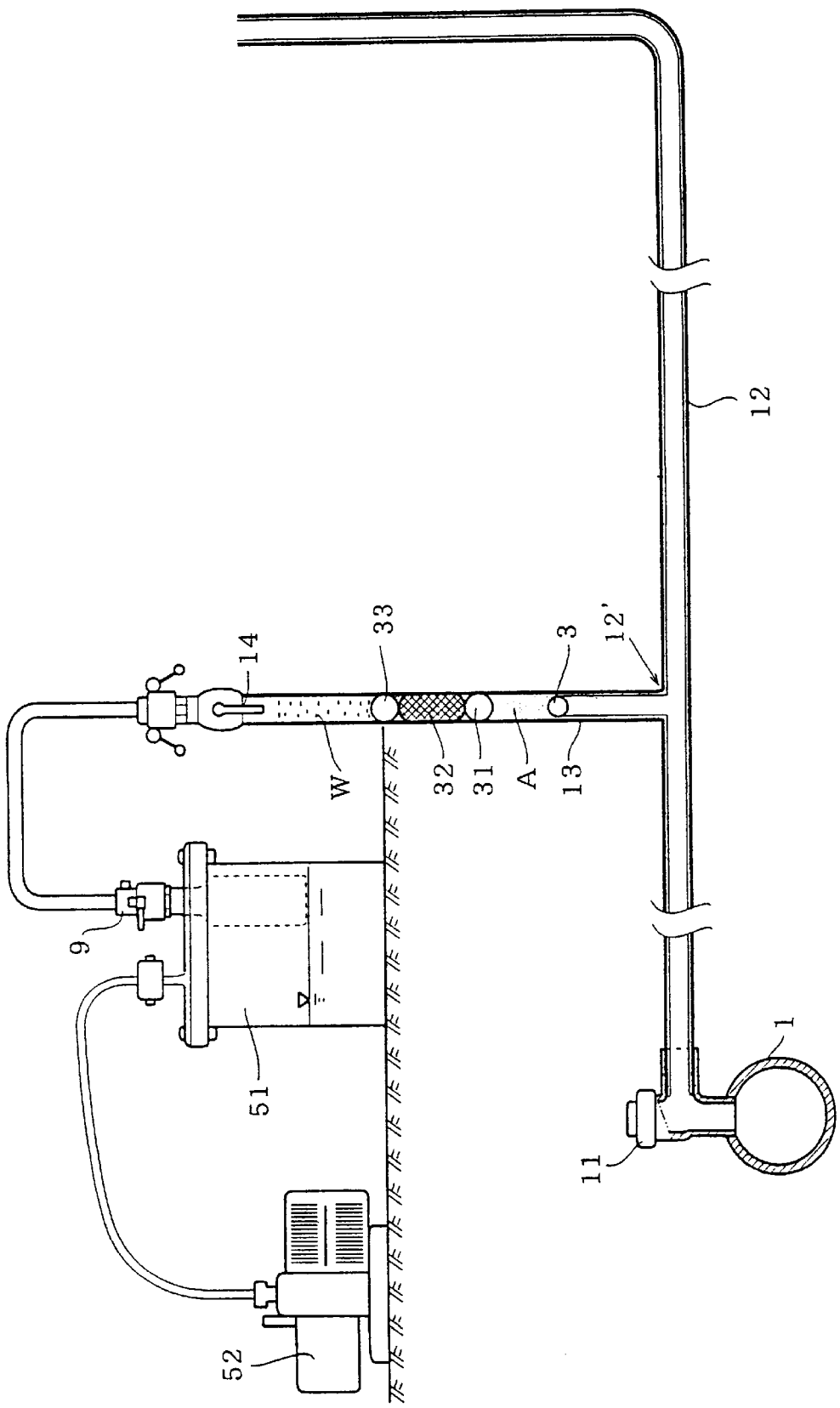
FIG. 6 is an explanatory view illustrating that the resin and the liquid are being drawn back so as to coat the internal surface of the branch pipe with a resin lining layer.

At step 5, as shown in FIG. 6, the pig receiving device 9, the liquid recovering tank 51, the suction pump 52, are connected in series to the open end 14 of the branch pipe 13, thereby forming the same suction system for the resin lining treatment on the branch pipe 13. Then, the suction system is actuated by driving the suction pump 52, so as to draw back the liquid W from the branch pipe 13. Similarly, with the backward movement of the liquid W toward the open end 14 of the branch pipe 13, the liquid blocking pig 33, the liquid absorbing material 32, the resin transporting pig 31, the resin A and the lining pig 3, are all caused to move back towards the open end 14 of the branch pipe 13. In this way, a desired resin lining layer having a uniform thickness may be formed on the internal surface of the branch pipe 13, thereby finishing the operation of the resin lining treatment on the branch pipe 13.

Although it has been described in the above embodiment that the method of the present invention is useful for repairing an existing pipeline including a main pipe and a branch pipe, it is also possible that the method of the present invention may be used to repair an existing pipe line including a main pipe and a plurality of branch pipes, by adding further steps simillar to the above step 1 (shown in FIG. 2) and step 2 (shown in FIG. 3) after the completion of the steps 1 and 2, and by adding further steps similar to the above step 5 (shown in FIG. 6) after the completion of the step 5.

As can be understood from the above description, with the use of the method according to the present invention, it has become possible to properly treat and repair an existing pipeline including a main pipe and one or more branch pipes, without causing any trouble in the resin lining treatment, thereby improving the efficiency of repairing an existing old pipeline and thus reducing a repairing cost.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A method of repairing an existing pipeline including a main pipe and a branch pipe, said method comprising the steps of:

introducing a first lining pig, a first batch of a resin, a first resin transporting pig, a first liquid absorbing material and a first liquid blocking pig into the branch pipe and supplying a first batch of a liquid into the branch pipe until the first lining pig reaches a branching position adjacent to the main pipe;

introducing a second lining pig, a second batch of a resin, a second resin transporting pig, a second liquid absorbing material and a second liquid blocking pig into the main pipe and supplying a second batch of a liquid into the main pipe until the second lining pig reaches an inner end thereof;

drawing back the second batch of the liquid out of the main pipe so as to cause the second batch of the resin to move back toward an open end of the main pipe, thereby forming a resin lining layer on the internal surface of the main pipe; and drawing back the first batch of the liquid out of the branch pipe so as to cause the first batch of the resin to move back toward an open end of the branch pipe, thereby forming a resin lining layer on the internal surface of the branch pipe, wherein the second batch of resin has an amount calculated in accordance with the length and diameter of the main pipe and is made sufficient to cover a length extending from the inner end of the main pipe to the branching position so as to block said branching position, thereby preventing the second batch of liquid from invading into the branch pipe once the second batch of resin has reached the inner end of the main pipe.

2. A method according to claim 1, wherein prior to introducing the first lining pig and the first batch of a resin into the branch pipe, an acoustic wave is emitted into the branch pipe from a pipe length measuring device attached at the open end thereof, the acoustic wave is then reflected from the inner wall of the main pipe and received by the pipe length measuring device, thereby obtaining a measured value representing the length of the branch pipe.

3. A method according to claim 1, wherein under a condition in which the branching position is blocked by the first lining pig and at a time prior to introducing the second lining pig and the second batch of a resin into the main pipe, an acoustic wave is emitted into the main pipe from a pipe length measuring device attached at the open end thereof, the acoustic wave is then reflected from the inner end of the main pipe and received by the pipe length measuring device, thereby obtaining a measured value representing the length of the main pipe.

4. A method according to claim 1, wherein the first batch of the liquid has a predetermined amount which is calculated by subtracting, from the total internal volume of the branch pipe, the volumes of the first lining pig, the first batch of a resin, the first resin transporting pig, the first liquid absorbing material and the first liquid blocking pig.

5. A method according to claim 4, wherein the first batch of the liquid is controlled in a manner such that once the predetermined amount has been introduced into the branch pipe, the liquid supply is stopped so that the first lining pig will stop at the branching position adjacent to the main pipe, thereby blocking the branching position so as to isolate the branch pipe from the main pipe.

* * * * *